(12) United States Patent
Safai

(10) Patent No.: US 12,523,586 B2
(45) Date of Patent: *Jan. 13, 2026

(54) VARIABLE PLASMA PULSE GENERATOR FOR BONDLINE STRENGTH VERIFICATION

(71) Applicant: The Boeing Company, Arlington, VA (US)

(72) Inventor: Morteza Safai, Newcastle, WA (US)

(73) Assignee: THE BOEING COMPANY, Arlington, VA (US)

( * ) Notice: Subject to any disclaimer, the term of this patent is extended or adjusted under 35 U.S.C. 154(b) by 358 days.

This patent is subject to a terminal disclaimer.

(21) Appl. No.: 18/301,391

(22) Filed: Apr. 17, 2023

(65) Prior Publication Data

US 2024/0344948 A1 Oct. 17, 2024

(51) Int. Cl.
*G01N 3/307* (2006.01)
*G01N 3/36* (2006.01)
(Continued)

(52) U.S. Cl.
CPC .......... *G01N 3/36* (2013.01); *G01N 2203/001* (2013.01); *G01N 2203/0048* (2013.01); *G01N 2203/005* (2013.01); *G01N 2203/0055* (2013.01); *G01N 2203/0067* (2013.01); *G01N 2203/0296* (2013.01)

(58) Field of Classification Search
CPC ............... G01N 3/36; G01N 2203/001; G01N 2203/0048; G01N 2203/005; G01N 2203/0055; G01N 2203/0067; G01N 2203/0296; G01N 19/04; G01N 29/22; G01M 7/08; H05H 1/24; A23L 3/015;
(Continued)

(56) References Cited

U.S. PATENT DOCUMENTS

| 8,742,282 B2 * | 6/2014 | Asokan | H01T 2/02 219/121.36 |
| 2004/0021216 A1 * | 2/2004 | Hosoya | H01L 24/73 257/E23.044 |

(Continued)

FOREIGN PATENT DOCUMENTS

| EP | 3352578 B1 | 9/2021 |
| EP | 4016037 A1 | 6/2022 |
| EP | 4253951 A2 | 10/2023 |

OTHER PUBLICATIONS

Communication Pursuant to Article 94(3) EPC issued Jun. 27, 2025 in corresponding EP Application No. 24163014.4, 8 pages.

*Primary Examiner* — Brandi N Hopkins
(74) *Attorney, Agent, or Firm* — MH2 Technology Law Group LLP

(57) ABSTRACT

A system and method for evaluating a bond is provided. The system uses an adjustable submerged plasma probe to generate a compression wave in a first vessel containing a liquid. The system further includes a second vessel in which a vacuum is pulled to hold the first vessel against a bonded structure being inspected. The compression wave is directed to propagate from the liquid into the bonded structure to apply a known force to the bond being inspected. The adjustable submerged plasma probe allows the intensity of the compression wave to be increased or decreased at the bonded structure.

20 Claims, 7 Drawing Sheets

(51) Int. Cl.
*G01N 19/04* (2006.01)
*G01N 29/04* (2006.01)
*G01N 29/22* (2006.01)
*H05H 1/24* (2006.01)
*H05H 1/34* (2006.01)

(58) Field of Classification Search
CPC .. A61L 2/025; B06B 1/00; B06B 3/04; B08B 7/00; B63B 9/00; C12N 13/00
See application file for complete search history.

(56) References Cited

U.S. PATENT DOCUMENTS

2021/0132025 A1* 5/2021 Safai ................. G01N 33/207
2022/0187178 A1  6/2022 Safai

* cited by examiner

VARIABLE PLASMA PULSE GENERATOR FOR BONDLINE STRENGTH VERIFICATION

FIELD OF THE DISCLOSURE

The present disclosure is directed to systems and methods for evaluating a bond in a bonded structure. More particularly, the present disclosure is directed to systems and methods for evaluating a bond in a bonded structure using an adjustable submerged plasma probe to generate a compression wave.

BACKGROUND

Laser bond inspection (LBI) is an inspection method that can be used to evaluate the quality of adhesive bonds in a structure. During laser bond inspection, a plasma is created by using a laser pulse to ablate a sacrificial layer to generate compression waves in the structure. The structure can be, for example, a composite structure including a carbon fiber reinforced polymer (CFRP)-to-CFRP bond or CFRP-to-metal bond. The compression wave mechanically creates a stress load on the adhesive bond. During exposure to this load, a weak bond will fail, and a strong bond will not. Structures with weak bonds are thus identified and repaired or discarded. However, current LBI systems require lasers and power supplies that are large and expensive. Therefore, an improved system and method for evaluating a bond that eliminates the laser is desired.

SUMMARY

As disclosed herein, a system for evaluating a bond includes a first vessel comprising one or more sidewalls and an endwall, a liquid port configured to connect to a source to fill the first vessel with a liquid, and an open portion configured to be placed against a bonded structure to be inspected and a second vessel surrounding the open portion of the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the bonded structure to be inspected. The system further includes a first electrode and a second electrode, the first electrode and the second electrode disposed on a first adjustable mount, wherein the first electrode and the second electrode are disposed within the first vessel, wherein the first electrode and the second electrode are separated by a gap length, and wherein the first adjustable mount is configured to change the gap length between the first and second electrodes. The system also includes a power supply connected to the first and the second electrodes, wherein the power supply is configured to provide an electrical pulse to create a plasma in the liquid between the first and the second electrodes to generate a compression wave.

As disclosed herein, a method for evaluating a bond includes adjusting a gap length between a first electrode and a second electrode, a distance between the first and second electrodes and a bonded structure being inspected, or both; placing an open portion of a first vessel against the bonded structure being inspected; and pulling a vacuum between an outer surface of the first vessel and an inner surface of a second vessel that encloses the first vessel, wherein pulling the vacuum seals the first vessel to the bonded structure. The method further includes filling the first vessel with a liquid, wherein the liquid contacts the bonded structure being inspected at the open portion; initiating a spark discharge between the first and second electrodes in the liquid to form a plasma to generate a compression wave in the liquid, wherein the compression wave propagates from the liquid into the bonded structure through the open portion to apply a force to a bond in the bonded structure; and inspecting the bond in the bonded structure.

As disclosed herein, another system for evaluating a bond includes a first vessel comprising an open portion configured to be placed against a bonded structure to be inspected and a second vessel surrounding the open portion of the first vessel. The system further includes a first electrode and a second electrode, the first electrode and the second electrode disposed on a first adjustable mount, wherein the first electrode and the second electrode are disposed within the first vessel, wherein the first electrode and the second electrode are separated by a gap length, and wherein the first adjustable mount is configured to change the gap length between the first and second electrodes. The system also includes a second adjustable mount on which the first adjustable mount is disposed, wherein the second adjustable mount is configured to change a distance between an end of the open portion of the first vessel and the first and second electrodes and a power supply connected to the first and the second electrodes, wherein the power supply is configured to provide an electrical pulse to create a plasma between the first and the second electrodes to generate a compression wave.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1A:
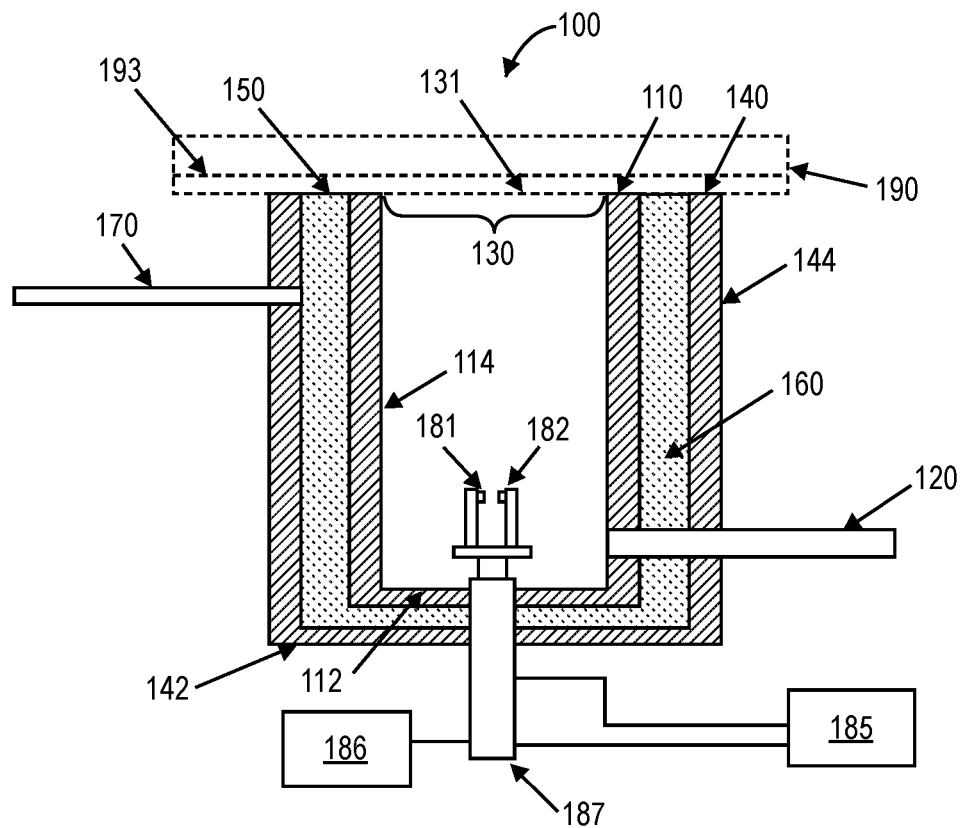
FIG. 1A schematically illustrates a cross-sectional view of a system for evaluating a bond in a bonded structure using an adjustable submerged plasma probe, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to an inspection system and method that uses an adjustable plasma probe to generate a compression wave to evaluate a strength of bonding parameters between two adjacent layers in a structure. Compression waves are also known as and referred to herein as stress waves or longitudinal waves. The inspection system includes a first vessel containing a liquid in which a plasma in the liquid generates a compression wave. The compression wave propagates from the liquid into the structure to mechanically stress a bond, as described in greater detail below. The bond can be, for example, an adhesive bond in a composite material between two dissimilar materials such as a metal and a composite or between two plies of similar composite materials. While the compression wave stresses the bond in a manner similar to LBI, the disclosed inspection system and method using the plasma eliminates the need for an expensive laser and its large power supply required for LBI thereby reducing the size and cost of the equipment for bond inspection. The reduced size further provides increased portability to allow easier and more efficient inspection of a greater range of shapes and sizes of bonded structures compared to, for example, ASTM Standard D5868-Lap Shear Adhesion for Fiber Reinforced Plastic (FRP) Bonding, ASTM Standard D1002-Apparent Shear Strength of Single-Lap-Joint Adhesively Bonded, and ASTM Standard D3167-Standard Test Method for Floating Roller Peel Resistance of Adhesives. Control and variability of pulse width and pulse intensity of the compression wave via the adjustable submerged plasma probe allows the same inspection chamber to be used for bonds of different types, thicknesses, and materials.

FIGS. 1A-1E illustrate schematic views of a system 100 for evaluating a bond in a bonded structure using an adjustable submerged plasma probe 187, according to an implementation. As shown in the cross-sectional schematic view of FIG. 1A, system 100 includes a first vessel 110 having an endwall 112, one or more sidewalls 114, and an open portion 130 opposite endwall 112. Open portion 130 can be an entire wall (e.g., an endwall) opposite endwall 112 or be a portion of the wall opposite endwall 112. First vessel 110 further includes a liquid port 120 that can be used to fill the first vessel with a liquid when connected to a source of liquid. As will be discussed in more detail below, first vessel 110 functions to contain the liquid and open portion 130 allows the liquid to contact a bonded structure to be inspected at an end of open portion 130. A bonded structure 190 shown in FIG. 1A can be, for example, a structure formed by a first component (e.g., a first layer) and a second component (e.g., a second layer) that are bonded together by a bond as described in more detail below.

System 100 also includes a second vessel 140 having one or more sidewalls 144, an endwall 142, an open portion 150, and a vacuum port 170 that can be connected to a vacuum system. Second vessel 140 surrounds open portion 130 of first vessel 110 and may completely enclose first vessel 110 as shown in FIG. 1A. This allows a vacuum to be pulled in a space 160 between an outer surface of first vessel 110 and an inner surface of second vessel 140 when system 100 is placed in contact with a bonded structure 190 to be inspected.

Figure 1B:
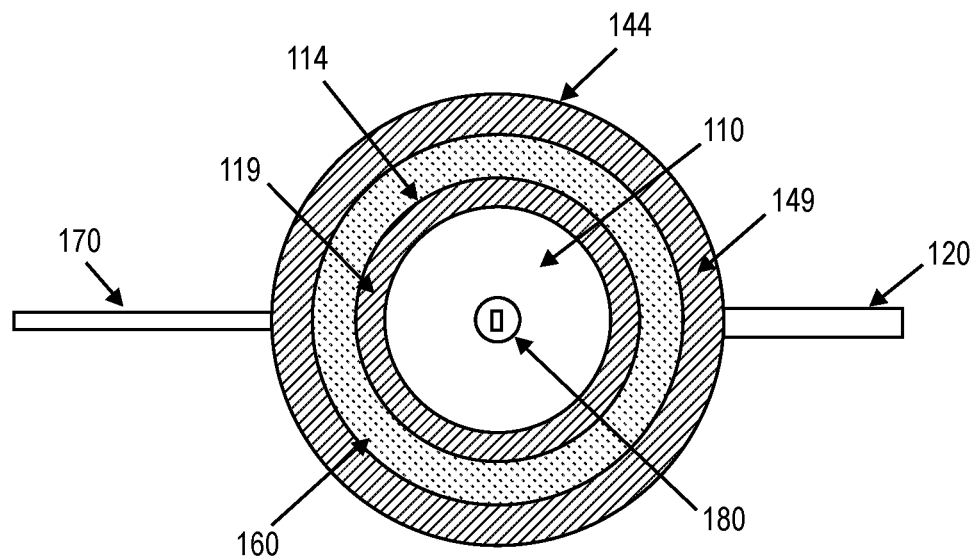
FIG. 1B schematically illustrates an end view of a system for evaluating a bond in a bonded structure using an adjustable submerged plasma probe, according to another implementation.

FIG. 1B shows an end view of system 100, specifically the end including the open portions that contact the bonded structure to be inspected. During inspection, the bonded structure is placed over open portion 130, at end of open portion 131 of first vessel 110, and open portion 150 of second vessel 140. First vessel 110 is filled with a liquid through liquid port 120 and a vacuum is pulled within space 160 via vacuum port 170. To keep the liquid within first vessel 110 from leaking and to facilitate establishing a vacuum in space 160, a seal 119 can optionally be included at an end of sidewall 114 adjacent to open portion 130 of first vessel 110. Similarly, a seal 149 can optionally be included at an end of sidewalls 144 adjacent to open portion 150 of second vessel 140. Although depicted as cylindrical in shape, one of ordinary skill in the art will understand that other shapes can be used, in particular, shapes that focus the compression wave toward the structure being inspected.

Figure 1C:
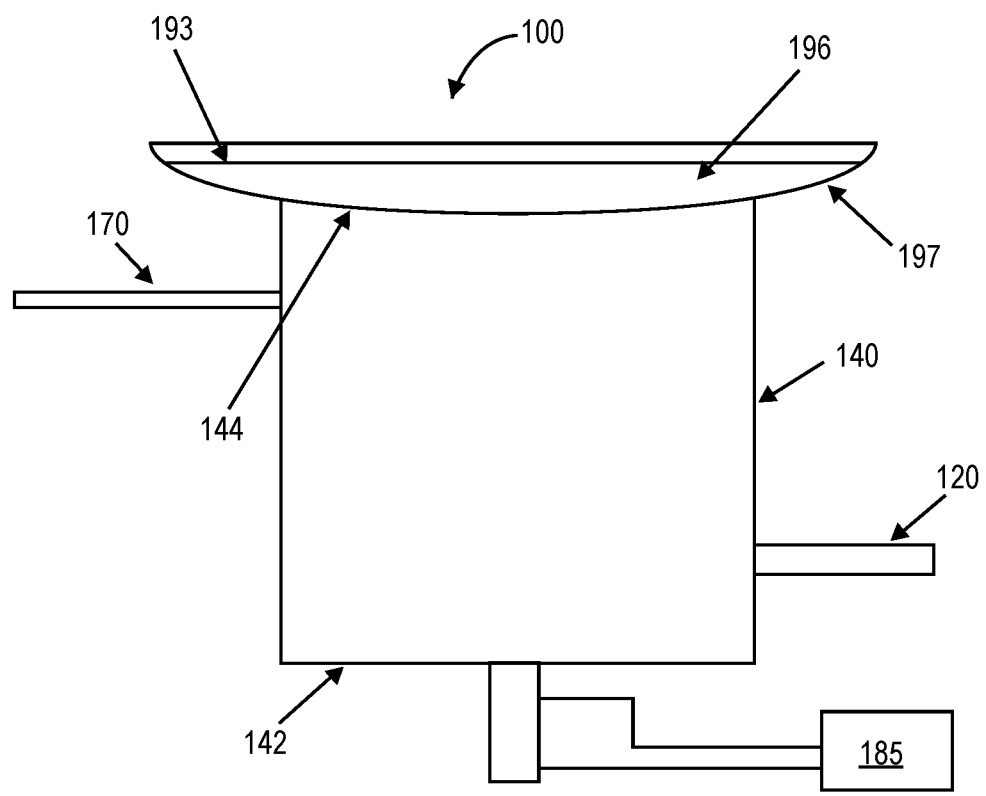
FIG. 1C schematically illustrates a side view of a system for evaluating a bond in a bonded structure having a curved surface using an adjustable submerged plasma probe, according to another implementation.

End of sidewall 114 at open portion 130 is depicted as planar to allow inspection of a bond within bonded structure 190 having a flat surface. A structure being inspected having a curved or shaped surface can be inspected by conforming ends of sidewalls of first vessel 110 and second vessel 140 to have a shape or curvature that matches a shape or curvature of the surface of the structure being inspected. As shown in FIG. 1C, a bonded structure 196 having a bond 193 can have a surface 197 that is shaped or curved and an end of sidewall 144 of second vessel 140 can have a shape or curvature that matches the shape or curvature of surface 197 of bonded structure 196. Similarly, an end of sidewall 114 of first vessel 110 can have a shape or curvature that matches a shape or curvature of surface 197 of the bonded structure 196 being inspected. Ends of the sidewalls that match the shape or curvature of the surface of the structure being inspected allows first vessel 110 to be filled with the liquid without leakage and allows the vacuum to be pulled in space 160 between first vessel 110 and second vessel 140. This can optionally be accomplished by seals 119 and 149 having a curvature and/or shape to match the shape or curvature of the surface of the structure being inspected. One of ordinary skill in the art will understand that surface 197 that is shaped or curved may affect propagation of the compressive wave from the liquid in first vessel 110 into bonded structure 196 and that the pulse amplitude and/or pulse width of the compressive wave may need to be adjusted.

System 100 further includes an adjustable submerged plasma probe 187 having a first electrode 181 and a second electrode 182 disposed within first vessel 110 and connected to a power supply 185. As used herein, first electrode 181 and second electrode 182 are a pair of electrodes, for example, an anode and a cathode, separated by a gap length. First electrode 181 and second electrode 182 are positioned so that the compression wave generated in the liquid propagates toward the structure being inspected. For example, first electrode 181 and second electrode 182 can be positioned in front of open portion 130 of first vessel 110 so that the compression wave propagates through open portion 130 into bonded structure 190 being inspected. System 100 also includes a controller 186 to adjust the gap length between first electrode 181 and second electrode 182, a distance between structure being inspected 190 and first electrode 181 and second electrode 182, or both.

Power supply 185 supplies an electrical pulse to initiate the spark discharge between first electrode 181 and second electrode 182. The electrical pulse generates a compression wave with high amplitude and short pulse width for bond inspection, for example, high amplitude and short pulse comparable to a compression wave generated by an LBI system. Power supply 185 can provide about 40 kV to about 60 kV to first electrode 181 and second electrode 182 and can be, for example, one or more banks of capacitors. The one or more banks of capacitors can be variable capacitors including time delay capability. Power supply 185 can also provide a voltage (e.g., and electrical pulse) via a transformer to produce arcing at pair of electrodes 180 at a desired voltage. Examples of transformers include, but are not limited to, an oscillator transformer and flyback transformer. Power supply 185 can also be a Van de Graaff belt high voltage electrostatic generator or other sources of an electrical pulse.

Figure 1D:
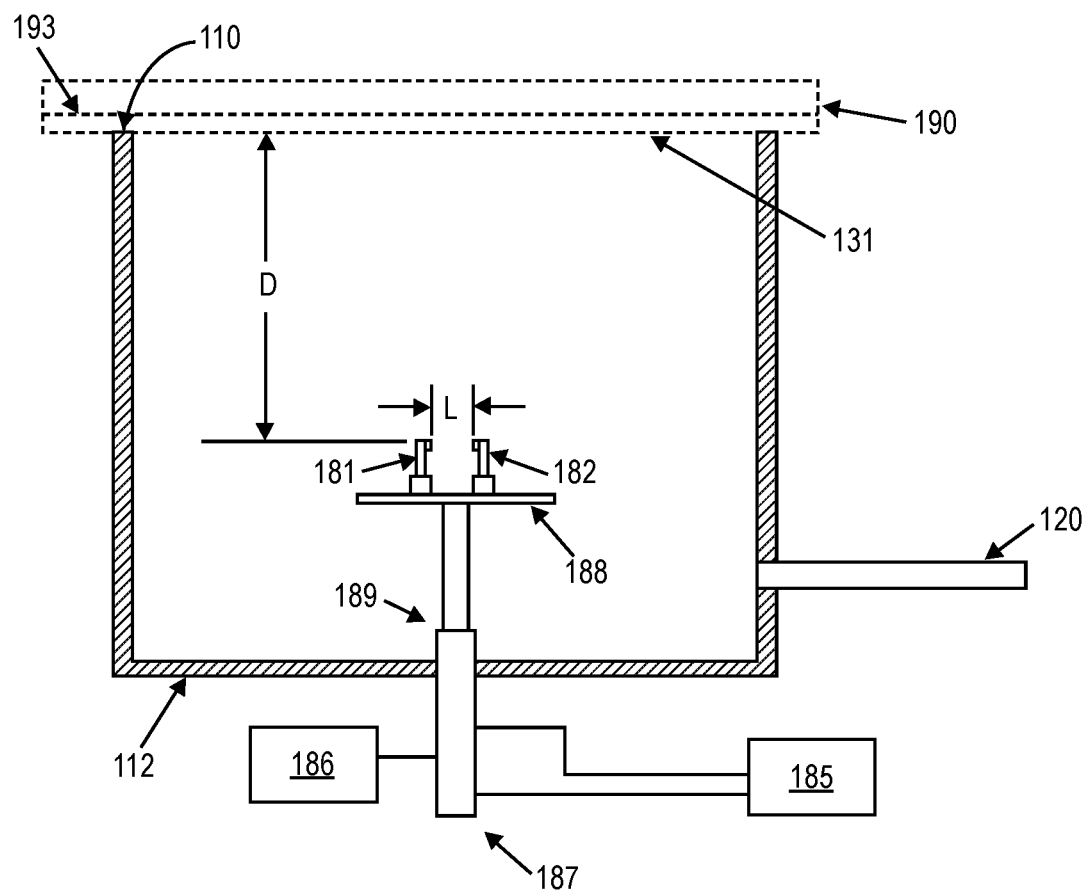
FIG. 1D schematically illustrates a portion of a system for evaluating a bond in a bonded structure focusing on an adjustable submerged plasma probe, according to another implementation.

FIG. 1D depicts a portion of system 100 to provide further details of adjustable submerged plasma probe 187. Adjustable submerged plasma probe 187 includes first electrode 181, second electrode 182, a first adjustable mount 188, a second adjustable mount 189, and controller 186.

Adjustable submerged plasma probe 187 includes first adjustable mount 188 disposed within first vessel 110 and which is connected to second adjustable mount 189. As shown in FIG. 1D, first adjustable mount 188 adjusts a gap length L between first electrode 181 and second electrode 182. Adjusting gap length L allows control of a pulse width of the compression wave. By decreasing gap length L, the pulse width of the compression wave can be made narrower. Similarly, by increasing gap length L, the pulse width of the compression wave can be made wider. The gap length can be adjusted from about 2 mm to about 20 mm. Examples of first adjustable mount include, but are not limited to, linear translation stages and x-y motorized or screw drive stages from PI L.P. (Auburn, MA), linear actuators and linear motion systems from Thompson (Radford, VA), and piezo actuators and translators from Queensgate Instruments (Cambridge, UK).

Second adjustable mount 189 passes through endwall 112 of first vessel 110 and endwall 142 of second vessel 140, as shown in FIG. 1A, to position first adjustable mount 188, first electrode 181, and second electrode 182 within first vessel 110. Second adjustable mount 189 can be a linear extending positioner, either manually or electronically controlled, to extend and retract. Second adjustable mount 189 can extend or retract to position first electrode 181, and second electrode 182 from about 2 cm to about 10 cm from bonded structure 190. Examples of second adjustable mount include, but are not limited to, nested posts, linear motion systems, and lifting columns from Thompson (Radford, VA), vertical lift stages and multi-axis positioners from PI L.P. (Auburn, MA).

As shown in FIG. 1D, second adjustable mount 189 positions first electrode 181 and second electrode 182 a distance L from end of open portion 131. In other words, L extends from bonded structure 190 having bond 193 to first electrode 181 and second electrode 182. D can about 2 cm to about 10 cm. By extending or retracting second adjustable mount 189, D can be increased or decreased to control an intensity of the compression wave at bonded structure 190. For example, increasing D will move first electrode 181 and second electrode 182 further from bonded structure 190 resulting in a decreased intensity of the compression wave at bonded structure 190. Decreasing distance L will move first electrode 181 and second electrode 182 closer to bonded structure 190 resulting in an increased intensity of the compression wave at bonded structure 190.

Controller 186 allows manual or electronic control of first adjustable mount 188 and second adjustable mount 189. Examples of controller 186 with manual control include, but are not limited to, a manual screw on second adjustable mount 189 and a clamp on a post on first adjustable mount 188. Examples of controller 186 with electronic control include, but are not limited, an electronic controller configured to move a motorized drive connected to a linear translation stage, a micro stage caliper and a nanometer actuator, and a piezo actuator and translator.

Changing gap length L and D allows control of the shock wave intensity generated by adjustable submerged plasma probe 187 at bonded structure 190. This allows use of system 100 to inspect bonded structures having different thicknesses and/or formed of different materials. For example, gap length L can be increased and/or distance W can be decreased to generate a compressions wave having a higher intensity and wider pulse width to test a bond in a thicker bonded structure. Gap length L can be decreased and/or distance W can be increased to generate a compressions wave having a lower intensity and narrower pulse width to inspect a thinner bonded structure. Gap length L and/or distance W can further be changed to control the intensity of the compression wave to inspect bonded structures formed of various materials, including but not limited to, polymers, metals, ceramics, and reinforced composite materials, such as carbon fiber reinforced polymers.

Figure 1E:
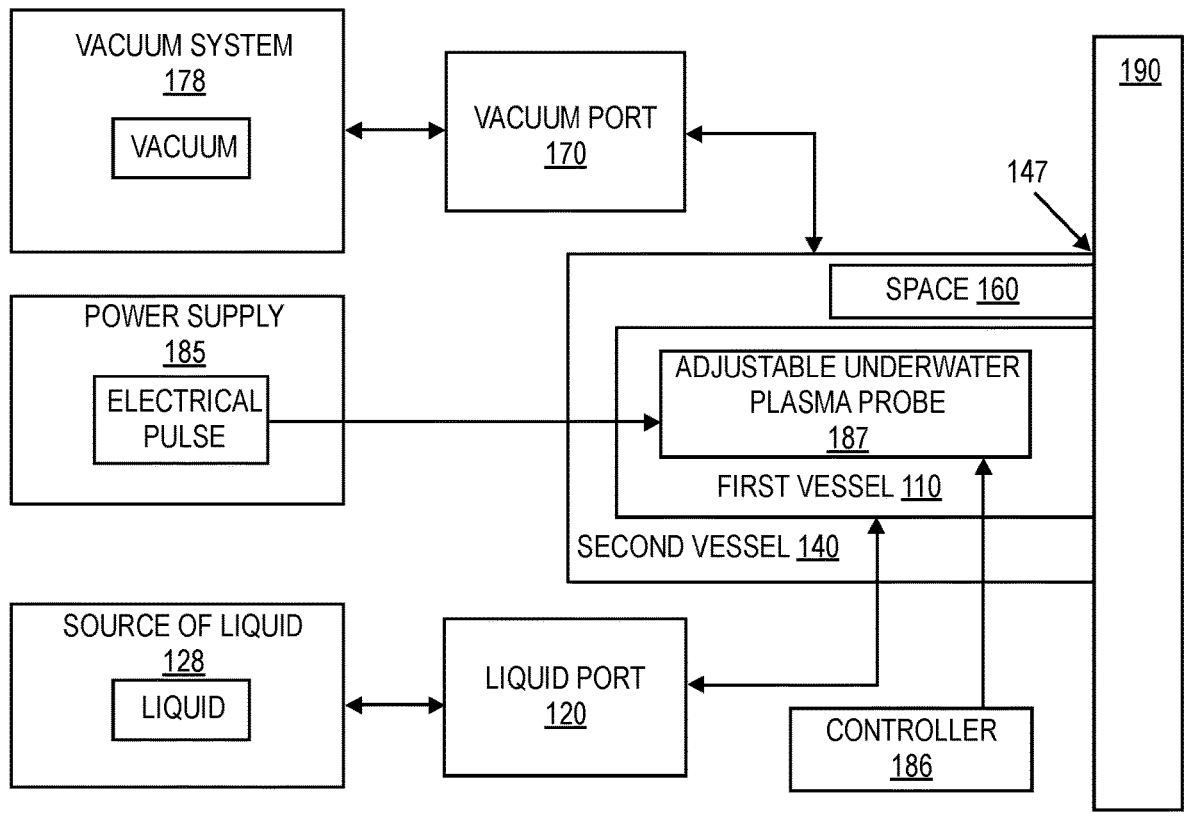
FIG. 1E is a functional block diagram of a system for evaluating an adhesive bond in a bonded structure using an adjustable submerged plasma probe, according to an implementation.

FIG. 1E is a function block diagram of system 100 for evaluating a bond in a bonded structure using a spark discharge in a liquid. System 100 is placed adjacent to bonded structure 190. A vacuum system 178 can pull a vacuum in space 160 in second vessel 140 via vacuum port 170. The vacuum secures system 100 against a surface of bonded structure 190 and seals 147 prevent loss of vacuum from space 160. A source of liquid 128 can fill first vessel 110 with a liquid via liquid port 120. Seals 147 can prevent the liquid from leaking out of first vessel 110 to avoid the presence of an air gap/pocket in first vessel 110 that could affect propagation of the compressive wave into bonded structure 190. Power supply 185 can provide an electrical pulse to adjustable submerged plasma probe 187 that results in a spark discharge that generates a plasma between first electrode 181 and second electrode 182. The spark discharge generates a compression wave that propagates from the liquid into bonded structure 190 to apply a force to the bond. Depending on the type, thickness, and materials of the bond being inspected, controller 186 can manually or electronically change the intensity and/or the pulse width of the compression wave at bonded structure 190. Subsequent to applying the force to the bond, source of liquid 128 can remove the liquid from first vessel 110 and vacuum system 178 can remove the vacuum from second vessel 140 to release the system from bonded structure 190.

Figure 2:
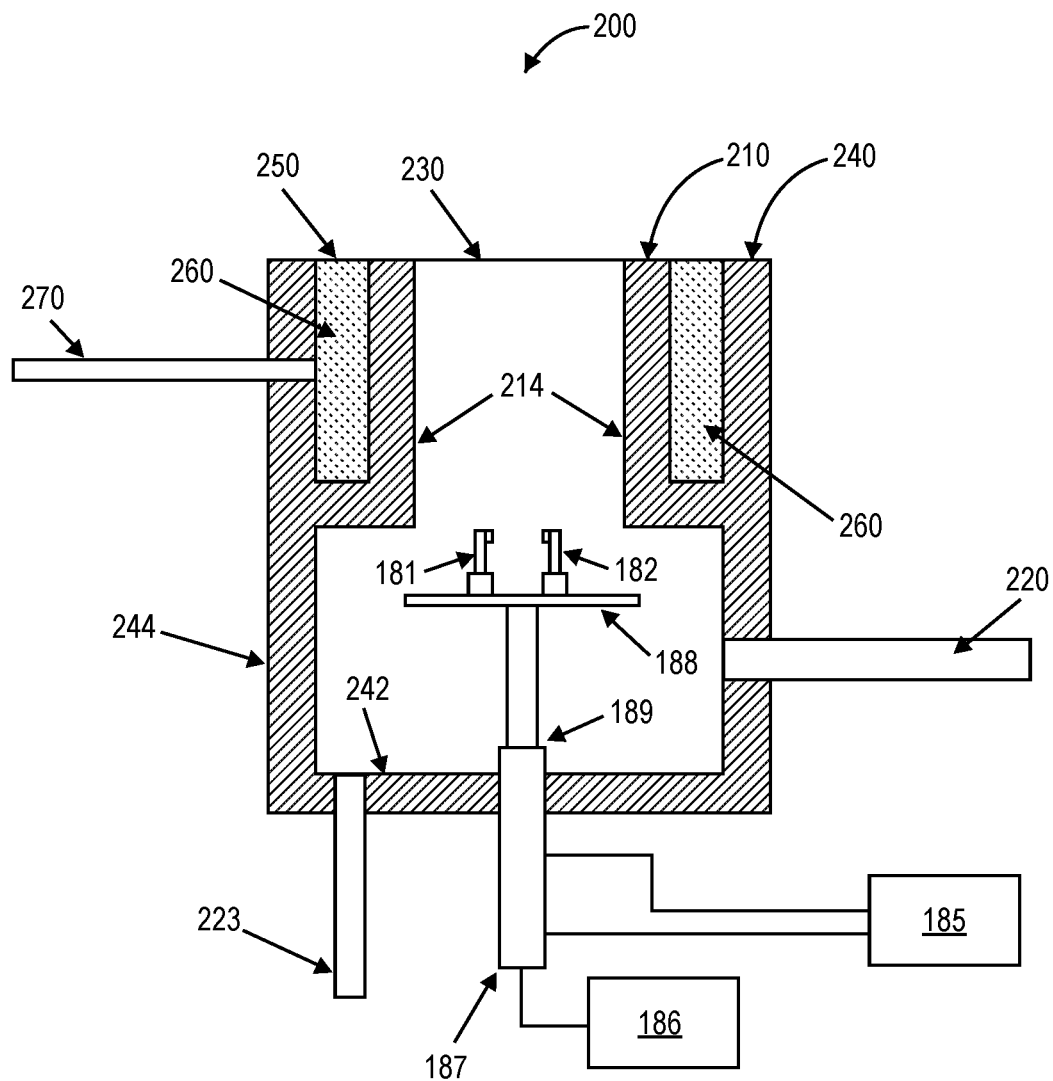
FIG. 2 schematically illustrates a cross-sectional view of a system for evaluating an adhesive bond in a bonded structure using an adjustable submerged plasma probe, according to another implementation.

FIG. 2 illustrates a cross-sectional view of a system 200 for evaluating a bond in a bonded structure in which a first vessel and a second vessel share common sidewalls and/or a common endwall, according to another implementation. System 200 includes a second vessel 240 having one or more sidewalls 244, an endwall 242, and an open portion 250 opposite endwall 242. Second vessel 240 also includes a vacuum port 270 that can pull a vacuum in space 260 when connected to a vacuum system. System 200 also includes a first vessel 210 having an endwall 242, one or more sidewalls 214, 244, and an open portion 230 that is opposite endwall 242. First vessel 210 further includes a liquid port 220 that can fill the first vessel with a liquid when connected to a source of liquid. First vessel 210 can optionally include an air vent 223 to remove air, for example in the form of bubbles, when first vessel 210 is filled with the liquid.

As shown in FIG. 2, second vessel 240 and first vessel 210 share endwall 242. Second vessel 240 also shares a portion of sidewall 244 with first vessel 210. In other words, endwall 242 functions as an endwall for both first vessel 210 and second vessel 240. Similarly, sidewall 244 functions as a sidewall for second vessel 240 and a portion of sidewall 244 also functions as a side wall for first vessel 210.

During inspection, a bonded structure is placed over open portion 230 of first vessel 210 and open portion 250 of second vessel 240. First vessel 210 is filled with the liquid through liquid port 220 and a vacuum is pulled within space 260 via vacuum port 270. Seals optionally located at the ends of the sidewalls that contact the bonded structure can keep the liquid within first vessel 210 from escaping and facilitate establishing a vacuum in space 260. Depending on the bonded structure being tested, the gap length between first electrode 181 second electrode 182 can be adjusted by controller 186 to control the pulse width of the compression wave. The distance between a bonded structure being inspected and first electrode 181 second electrode 182 can also be adjusted by controller 186 to control the intensity of the compression wave.

First electrode 181 second electrode 182, immersed in the liquid, are provided with an electrical pulse from a power supply 285. The electrical are formed between first electrode 181 second electrode 182 generates a plasma within the liquid that in turn generates a compression wave directed towards the bonded structure through open portion 230 of first vessel 210.

Figure 3:
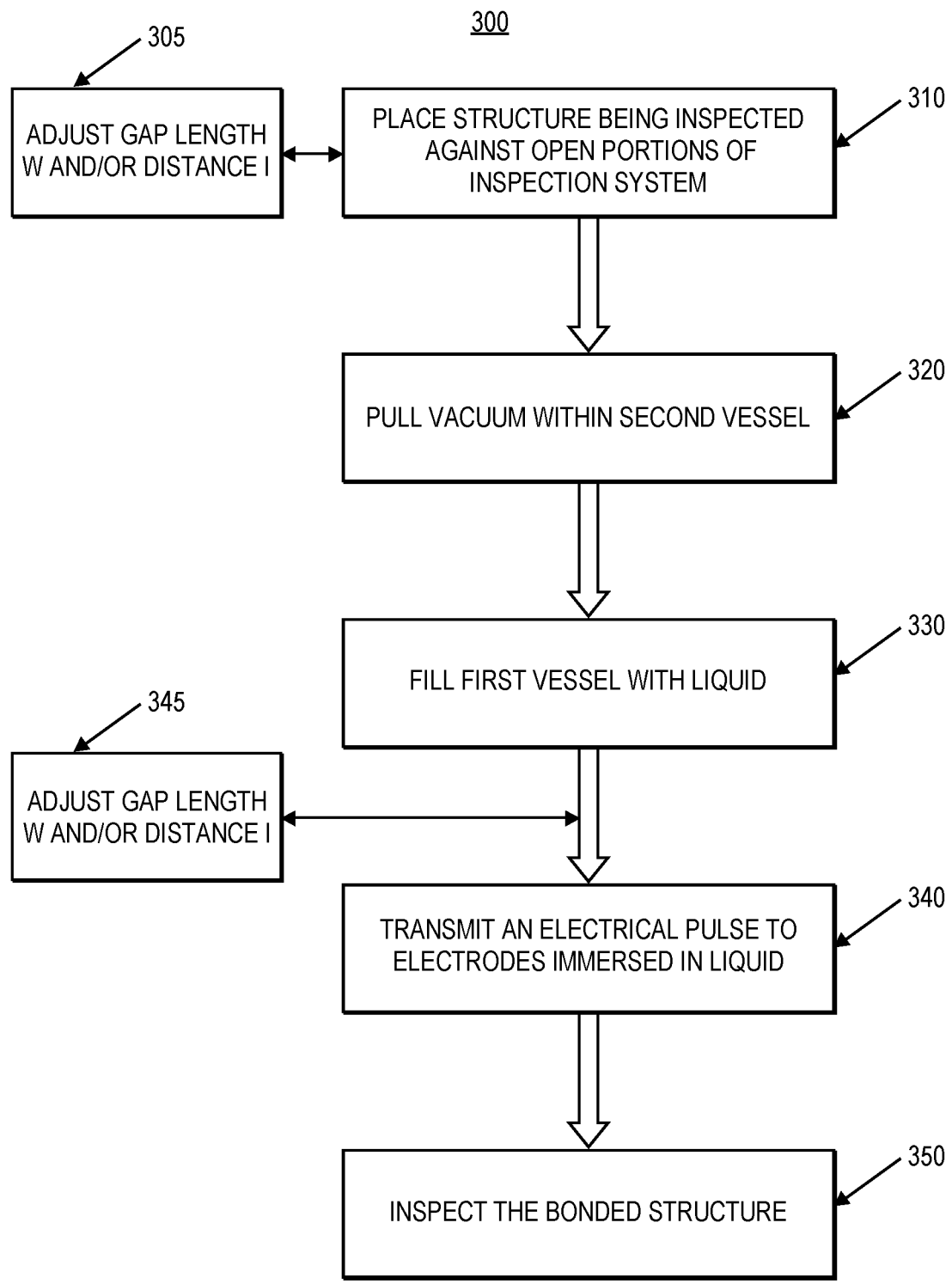
FIG. 3 is a flowchart of a method for evaluating a bond in a bonded structure using an adjustable submerged plasma probe, according to an implementation.

FIG. 3 is a flowchart illustrating a method for 300 for evaluating a bond in a structure, according to an implementation.

At 305 of method 300, the gap length between the first electrode and the second electrode can optionally be adjusted to control a pulse width of the compression wave. The distance between the structure being inspected and the first and second electrodes can also optionally be adjusted to control an intensity of the compression wave. The optional adjustments can be made manually or electronically. According to the present disclosure, the gap length between the first electrode and the second electrode can be adjusted and/or the distance between the structure being inspected and the first and second electrodes can be adjusted so that a threshold level of force is applied to the bond by the compression wave. For example, the threshold level can be a fifty percent nominal failure rate previously determined and recorded on a lookup table. Nominal failure rates for bonds are generally previously determined through destructive testing. For example, multiple peel tests of similar CFRP bonds having specific thicknesses and materials are generally conducted to determine a nominal failure rate which is then recorded on a lookup table. The lookup table can include nominal failure rates for various types of bonds having different thicknesses and/or materials. At 305 of method 300, the nominal failure rate of the specific bond being tested can be determined by referencing the lookup table and the threshold level can be set at 50% of the nominal failure rate. In other words, adjustments to the gap length and/or the distance between the structure being inspected and the first and second electrodes can be adjusted so that the compression wave exerts 50% of the nominal failure rate for the specific bond being inspected.

Figure 4:
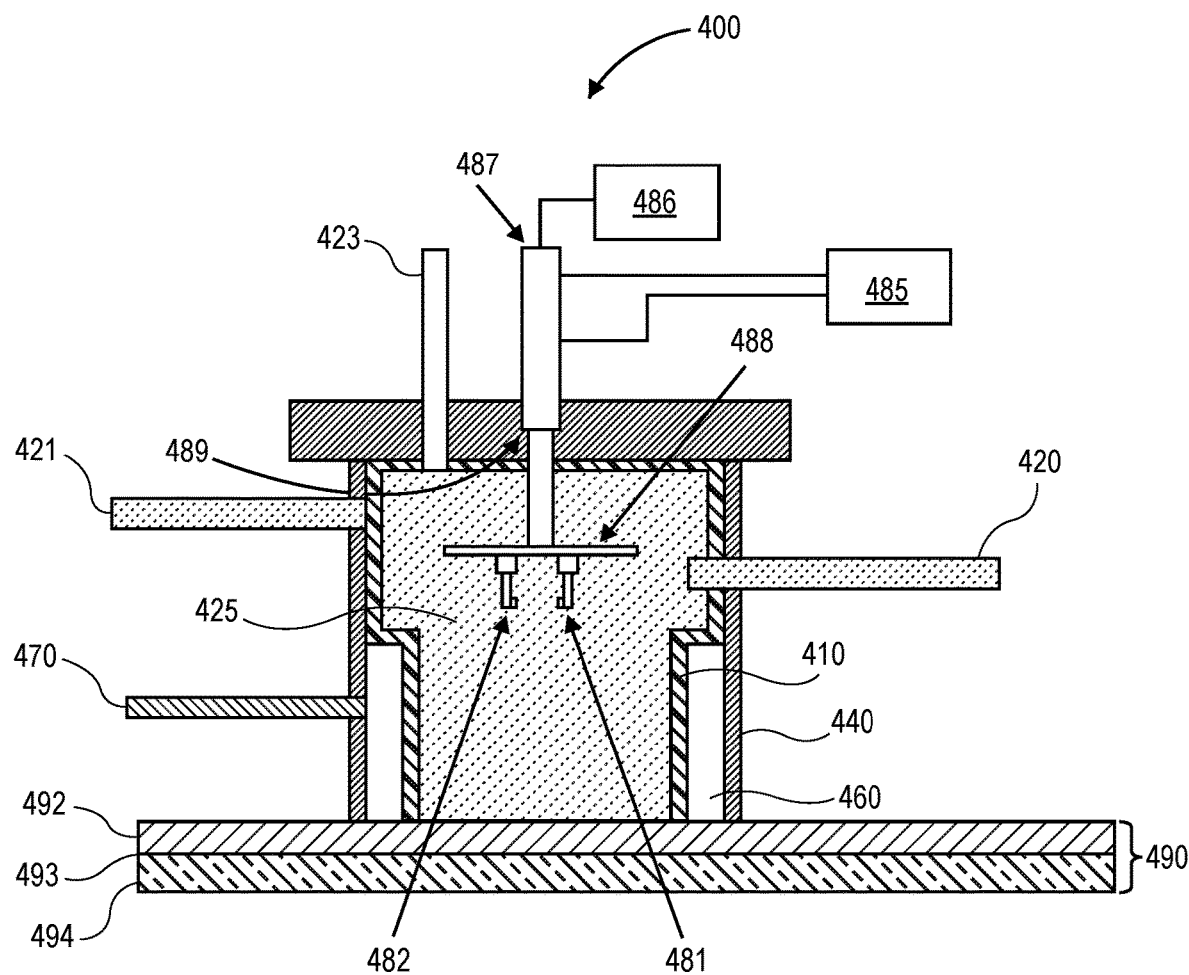
FIG. 4 schematically illustrates a cross sectional view of a system for evaluating a bond in a bonded structure using an adjustable submerged plasma probe, according to an implementation.

At 310 of method 300, a system for evaluating a bond as disclosed herein can be placed against the structure being inspected. Referring to FIG. 4 that schematically illustrates operation of a system as disclosed herein, a system 400 for evaluating a bond can be placed against a structure 490 being inspected. Structure 490 can be, for example, a structure formed by a first component 492 and a second component 494 that are adhesively bonded together by a bond 493. First component 492 and second component 494 can be, for example, layers within a composite structure. As will be appreciated, there may be more components that are bonded together, but for simplicity, only two components are illustrated. In some examples, first component 492 and second components 494 are made at least partially from CFRP. In other examples, first component 492 is made at least partially from CFRP, and second component 494 is made at least partially from metal. Bond 493 can include a bond material such as a resin, an adhesive, or an epoxy (e.g., boron epoxy or carbon epoxy).

System 400 is placed against structure 490 so that open portions of a first vessel 410 and a second vessel 440 are closed by structure 490. In other words, structure 490 closes open portions of first vessel 410 to allow liquid to fill first vessel 410 and to contact a surface of structure 490. Structure 490 also closes open portions of second vessel 440 to allow a vacuum to be pulled in second vessel 440, for example, in space 460 between the inside of a sidewall of second vessel 440 and an outside of a sidewall of first vessel 410.

At 320 of method 300, a vacuum is pulled within second vessel 440. Referring to FIG. 4, the vacuum is pulled in space 460 of second vessel 440 via a vacuum port 470 connected to a vacuum system. The vacuum holds first vessel 410 and second vessel 440 against structure 490 to create a watertight chamber within first vessel 410 and to keep system 400 from moving during inspection, for example, when a compression wave is generated. The vacuum also enables system 400 to be placed in various orientations where system 400 may held against structure 490 by the vacuum, for example, where structure 490 includes a vertical or angled surface to be inspected. Seals, sealant materials, or gaskets can be disposed between ends of the sidewalls adjacent to the open portions and structure 490 to assist pulling and retaining the vacuum and/or to prevent leakage of the liquid. The vacuum further allows system 400 to be placed with open portion of first vessel 410 at various orientations, such as facing up as shown in FIGS. 1A and 2, facing down as shown in FIG. 4, or facing sideways at any angle.

At 330 of method 300, the first vessel is filled with a liquid. Referring to FIG. 4, first vessel 410 is filled with a liquid 425 via a liquid port 420 connected to a source of liquid. Liquid 425 can be water, for example, deionized water, or an oil, such as a mineral oil or a nonconductive oil. Liquid 425 serves as a medium to generate and propagate a compression wave generated by the spark discharge in liquid 425. First vessel 410 can optionally be filled with the liquid to a pressure up to about 100 psi, for example from about 5 to about 90 psi, or from about 10 to about 75 psi. The pressure within first vessel 410 can increase an amplitude of the compression wave generated at 340 of method 300 below. System 400 can also optionally include additional liquid ports, for example, a second liquid port 421 to increase the speed of filling and emptying vessel 410 and/or to prevent contamination of the source of liquid due to breakdown of the liquid by the plasma. System 400 can also optionally include an air vent 423 configured allow removal of air, for example, air bubbles, from vessel 410. Valves capable of withstanding the stress wave generated by system 400 can be used to close off system 400 at air vent 423, liquid ports 420, 412, and/or vacuum port 470. Examples of suitable valves include, but are not limited to, actuated valves and mechanical valves.

At 340 of method 300, an electrical pulse is transmitted to a pair of electrodes that are immersed in the liquid in the first vessel to initiate a spark discharge. Referring again to FIG. 4, an adjustable submerged plasma probe 487 includes a first electrode 181 and a second electrode 182. First electrode 481 and a second electrode 482 are disposed on a first mount 488 that can increase and decrease a gap length between the electrodes. First mount 488 is disposed on a second adjustable mount 189 that can increase and decrease a distance between bonded structure being inspected 490. First electrode 481 and a second electrode 482 are immersed in liquid 425 within first vessel 410.

The electrical pulse is provided by a power supply 485, for example, a bank of capacitors, a voltage induction source, or voltage switching source, provides a voltage capable of forming a plasma with a liquid that generates a high amplitude, short wavelength compression wave for bond inspection. The high amplitude, short wavelength compression wave can have a pulse width of about 100 ns to about 300 ns and an energy of about 5 to about 40 Joules. The high amplitude, short wavelength compression wave can further be comparable to a compression wave generated during LBI inspection. Power supply 485 can provide about 40 kV to about 60 kV to pair of first electrode 481 and second electrode 482 to generate the plasma in the liquid and the resulting compression wave having a duration or pulse width of about 100 ns to about 300 ns and an energy of about 5 to about 40 Joules.

Although not wishing to be bound by any particular theory, it is believed that the electrical pulse when transferred to the pair of electrodes causes a high intensity electric field that bridges the gap length between the pair of electrodes within the liquid. This results in ionization of the liquid molecules and formation of a gaseous plasma. High temperature and pressure generated by the plasma and opposed by the liquid, results in an acoustic wave, e.g., a compression wave, that propagates outwards with an amplitude sufficient to change the density of the liquid.

The compression wave generated in liquid 425 by the plasma propagates through the liquid and into first component 492 of structure 490. The compression wave propagates through first component 492 and applies a force to bond 493. In various implementations, the force needed to damage or break a bond with a satisfactory/passing quality may be known prior to performing the disclosed method. Thus, the force can be a predetermined force, for example, from about 30% to about 70% (e.g., about 50%) of the force required to break bond 493, in a manner similar to adhesive bond testing by LBI or peel ply. The predetermined force applied by the compression wave is controlled by, for example, the gap length between the electrodes, the size and width of electrical pulse, and size and shape of the first vessel, and/or the liquid in the vessel. A force can further be applied to bond 493 from a reflected compression wave after the compression wave is reflected from a surface of first component 492, a surface of second component 494, and/or bond 493. The predetermined force can be based on, for example, peel ply testing in a manner similar to establishing a predetermined force in laser bond inspection.

Depending on the compression wave generated at 340 of method 300, it may be desirable to change the intensity of the compression wave. At 345 of method 300, the gap length between the first electrode and the second electrode can optionally be adjusted, and/or the distance between structure 490 and the first and second electrodes can be adjusted to increase or decrease an intensity of the compression wave. The optional adjustments can be made manually or electronically by controller 486.

At 350 of method 300, the bond can be inspected. For example, bond 493 can be inspected with a non-destructive inspection (NDI) system including but not limited to an ultrasound imaging system or an ultrasonic inspection system. The inspection detects inconsistencies and/or damage to the bond that occurs in response to the compression wave and/or a reflected compression wave reflected from a back surface of the structure. If the inspection reveals that bond 493 is fractured or broken, then the quality of the bond is determined to be bad (i.e., the bond did not pass inspection). If the inspection reveals that bond 493 (e.g., material forming the bond) is not fractured or broken, then the quality of the bond is determined to be good (i.e., the bond passes inspection). Such an inspection of the bond is comparable to inspection by LBI and ASTM D5528-13—Standard Test Method for Mode 1 Interlaminar Fracture Toughness of Unidirectional Fiber-reinforced Polymer matrix composites. Alternative or additional steps may also be performed.

The disclosed system and method can replace destructive testing such as peel ply tests, which use mechanically applied stress to pull a bond apart. The disclosed system and method can also replace LBI tests, which use an expensive and large laser/power supply and further requires a sacrificial material for ablation to generate a compression wave.

Further, the disclosure comprises examples according to the following clauses:

Clause 1. A system for evaluating a bond comprising: a first vessel comprising one or more sidewalls and an endwall, a liquid port configured to connect to a source to fill the first vessel with a liquid, and an open portion configured to be placed against a bonded structure to be inspected, a second vessel surrounding the open portion of the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the bonded structure to be inspected; a first electrode and a second electrode, the first electrode and the second electrode disposed on a first adjustable mount, wherein the first electrode and the second electrode are disposed within the first vessel, wherein the first electrode and the second electrode are separated by a gap length, and wherein the first adjustable mount is configured to change the gap length between the first and second electrodes; and a power supply connected to the first and the second electrodes, wherein the power supply is configured to provide an electrical pulse to create a plasma between the first and the second electrodes to generate a compression wave.

Clause 2. The system of clause 1, wherein the first adjustable mount changes the gap length from about 2 mm to about 20 mm Clause 3. The system of any previous clause, further comprising a second adjustable mount on which the first adjustable mount is disposed, wherein the second adjustable mount is configured to change a distance between an end of the open portion of the first vessel and the first and second electrodes.

Clause 4. The system of any previous clause, wherein the first adjustable mount changes the distance between the open portion of the first vessel and the first and second electrodes from about 2 cm to about 10 cm.

Clause 5. The system of any previous clause, wherein the first electrode comprises an anode and the second electrode comprises a cathode, and wherein the electrical pulse provided by the power supply bridges the liquid between the gap length between the anode and cathode to generate the plasma.

Clause 6. The system of any previous clause, wherein the power supply provides about 40 kV to about 60 kV to the first and the second electrodes.

Clause 7. The system of any previous clause, further comprising a controller that manually or electronically changes the gap length.

Clause 8. The system of any previous clause, where a controller manually or electronically changes the distance between the end of open portion of the first vessel and the first and second electrodes.

Clause 9. The system of any previous clause, wherein the controller is an electronic controller and is disposed outside of the first vessel and the second vessel.

Clause 10. The system of any previous clause, wherein the gap length and the distance between the open portion of the first vessel and the first and second electrodes generates a compression wave with a pulse width of about 100 ns to about 300 ns and an energy of about 5 to about 40 Joules.

Clause 11. A method for evaluating a bond, comprising: adjusting a gap length between a first electrode and a second electrode, a distance between the first and second electrodes and a bonded structure being inspected, or both; placing an open portion of a first vessel against the bonded structure being inspected; pulling a vacuum between an outer surface of the first vessel and an inner surface of a second vessel that encloses the first vessel, wherein pulling the vacuum seals the first vessel to the bonded structure; filling the first vessel with a liquid, wherein the liquid contacts the bonded structure being inspected at the open portion; initiating a spark discharge between the first and second electrodes in the liquid to form a plasma to generate a compression wave in the liquid, wherein the compression wave propagates from the liquid into the bonded structure through the open portion to apply a force to a bond in the bonded structure; and inspecting the bond in the bonded structure.

Clause 12. The method of clause 11, wherein adjusting the gap length between the first electrode and the second electrode, a distance between the first and second electrodes and the bonded structure being inspected, or both, adjusts the force applied to the bond in the bonded structure to a threshold level.

Clause 13. The method of any previous clause, wherein the threshold level is a fifty percent nominal failure rate.

Clause 14. The method of any previous clause, wherein initiating the spark discharge in the liquid comprises supplying about 40 kV to about 60 kV to the first and second electrodes.

Clause 15. The method of any previous clause, wherein a gap length between a first electrode and a second electrode is adjusted to generate a compression wave in the liquid having a pulse width ranging from about 100 ns to about 300 ns.

Clause 16. The method of any previous clause, wherein adjusting the gap length between the first electrode and the second electrode, the distance between the first and second electrodes and the bonded structure being inspected, or both, generates the compression wave that applies a force to the bond that is about 30% to about 70% of a force required to break the bond.

Clause 17. The method of any previous clause, wherein adjusting a gap length between a first electrode and a second electrode, a distance between the first and second electrodes and the bonded structure being inspected, or both, occurs subsequent to pulling the vacuum between the outer surface of the first vessel and the inner surface of the second vessel that encloses the first vessel to seal the first vessel to the bonded structure.

Clause 18. The method of any previous clause, wherein adjusting a gap length between a first electrode and a second electrode, a distance between the first and second electrodes and the bonded structure being inspected, or both, occurs subsequent to inspecting the bond in the bonded structure.

Clause 19. The method of any previous clause, wherein the bonded structure comprises a metal-to-composite adhesive bond or a composite-to-composite adhesive bond.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A system for evaluating a bond comprising:
   a first vessel comprising one or more sidewalls and an endwall, a liquid port configured to connect to a source to fill the first vessel with a liquid, and an open portion configured to be placed against a bonded structure to be inspected,
   a second vessel surrounding the open portion of the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the bonded structure to be inspected;
   a first electrode and a second electrode, the first electrode and the second electrode disposed on a first adjustable mount,
      wherein the first electrode and the second electrode are disposed within the first vessel,
      wherein the first electrode and the second electrode are separated by a gap length, and
      wherein the first adjustable mount is configured to change the gap length between the first and second electrodes; and
   a power supply connected to the first and the second electrodes, wherein the power supply is configured to provide an electrical pulse to create a plasma between the first and the second electrodes to generate a compression wave.

2. The system of claim 1, wherein the first adjustable mount changes the gap length from about 2 mm to about 20 mm.

3. The system of claim 1, further comprising a second adjustable mount on which the first adjustable mount is disposed, wherein the second adjustable mount is configured to change a distance between an end of the open portion of the first vessel and the first and second electrodes.

4. The system of claim 3, wherein the first adjustable mount changes the distance between the open portion of the first vessel and the first and second electrodes from about 2 cm to about 10 cm.

5. The system of claim 4, wherein the gap length and the distance between the open portion of the first vessel and the first and second electrodes generates a compression wave with a pulse width of about 100 ns to about 300 ns and an energy of about 5 to about 40 Joules.

6. The system of claim 3, where a controller manually or electronically changes the distance between the end of open portion of the first vessel and the first and second electrodes.

7. The system of claim 1, wherein the first electrode comprises an anode and the second electrode comprises a cathode, and wherein the electrical pulse provided by the power supply bridges the liquid between the gap length between the anode and cathode to generate the plasma.

8. The system of claim 1, wherein the power supply provides about 40 kV to about 60 kV to the first and the second electrodes.

9. The system of claim 1, further comprising a controller that manually or electronically changes the gap length.

10. The system of claim 9, wherein the controller is an electronic controller and is disposed outside of the first vessel and the second vessel.

11. A method for evaluating a bond, comprising:
    adjusting a gap length between a first electrode and a second electrode, a distance between the first and second electrodes and a bonded structure being inspected, or both the gap length and the distance;
    placing an open portion of a first vessel against the bonded structure being inspected;
    pulling a vacuum between an outer surface of the first vessel and an inner surface of a second vessel that encloses the first vessel, wherein pulling the vacuum seals the first vessel to the bonded structure;
    filling the first vessel with a liquid, wherein the liquid contacts the bonded structure being inspected at the open portion;
    initiating a spark discharge between the first and second electrodes in the liquid to form a plasma to generate a compression wave in the liquid, wherein the compression wave propagates from the liquid into the bonded structure through the open portion to apply a force to a bond in the bonded structure; and
    inspecting the bond in the bonded structure.

12. The method of claim 11, wherein adjusting the gap length between the first electrode and the second electrode, a distance between the first and second electrodes and the bonded structure being inspected, or both the gap length and the distance, adjusts the force applied to the bond in the bonded structure to a threshold level.

13. The method of claim 12, wherein the threshold level is a fifty percent nominal failure rate.

14. The method of claim 11, wherein initiating the spark discharge in the liquid comprises supplying about 40 kV to about 60 kV to the first and second electrodes.

15. The method of claim 11, wherein a gap length between a first electrode and a second electrode is adjusted to generate a compression wave in the liquid having a pulse width ranging from about 100 ns to about 300 ns.

16. The method of claim 11, wherein adjusting the gap length between the first electrode and the second electrode, the distance between the first and second electrodes and the bonded structure being inspected, or both the gap length and the distance, generates the compression wave that applies a force to the bond that is about 30% to about 70% of a force required to break the bond.

17. The method of claim 11, wherein adjusting a gap length between a first electrode and a second electrode, a distance between the first and second electrodes and the bonded structure being inspected, or both the gap length and the distance, occurs subsequent to pulling the vacuum between the outer surface of the first vessel and the inner surface of the second vessel that encloses the first vessel to seal the first vessel to the bonded structure.

18. The method of claim 11, wherein adjusting a gap length between a first electrode and a second electrode, a distance between the first and second electrodes and the bonded structure being inspected, or both the gap length and the distance, occurs subsequent to inspecting the bond in the bonded structure.

19. The method of claim 11, wherein the bonded structure comprises a metal-to-composite adhesive bond or a composite-to-composite adhesive bond.

20. A system for evaluating a bond comprising:
a first vessel comprising an open portion configured to be placed against a bonded structure to be inspected,
a second vessel surrounding the open portion of the first vessel;
a first electrode and a second electrode, the first electrode and the second electrode disposed on a first adjustable mount,
  wherein the first electrode and the second electrode are disposed within the first vessel,
  wherein the first electrode and the second electrode are separated by a gap length, and
  wherein the first adjustable mount is configured to change the gap length between the first and second electrodes;
a second adjustable mount on which the first adjustable mount is disposed, wherein the second adjustable mount is configured to change a distance between an end of the open portion of the first vessel and the first and second electrodes; and
a power supply connected to the first and the second electrodes, wherein the power supply is configured to provide an electrical pulse to create a plasma between the first and the second electrodes to generate a compression wave.

* * * * *